(12) United States Patent
Stark et al.

(10) Patent No.: US 11,447,427 B2
(45) Date of Patent: Sep. 20, 2022

(54) METHODS FOR CONTROLLING PATHOGENIC PLANT NEMATODES AND FOR IMPROVING THE HEALTH AND/OR PERFORMANCE OF RUMINANT ANIMALS

(71) Applicant: HOLGANIX LLC, Glenn Mills, PA (US)

(72) Inventors: David Stark, Chesterfield, MO (US); Robert Neidermyer, Plainville, CT (US)

(73) Assignee: HOLGANIX, LLC, Glen Mills, PA (US)

( * ) Notice: Subject to any disclaimer, the term of this patent is extended or adjusted under 35 U.S.C. 154(b) by 222 days.

(21) Appl. No.: 16/035,248

(22) Filed: Jul. 13, 2018

(65) Prior Publication Data

US 2019/0037853 A1 Feb. 7, 2019

Related U.S. Application Data

(60) Provisional application No. 62/531,910, filed on Jul. 13, 2017.

(51) Int. Cl.

| | |
|---|---|
| *A23K 10/18* | (2016.01) |
| *C05F 11/08* | (2006.01) |
| *C05F 9/04* | (2006.01) |
| *C05F 11/02* | (2006.01) |
| *C05F 17/00* | (2020.01) |
| *A23K 50/10* | (2016.01) |
| *C05G 3/00* | (2020.01) |
| *A01N 63/30* | (2020.01) |

(Continued)

(52) U.S. Cl.
CPC ............. *C05F 9/04* (2013.01); *A01N 63/30* (2020.01); *A01N 63/32* (2020.01); *A01N 63/38* (2020.01); *A23K 10/18* (2016.05); *A23K 50/10* (2016.05); *C05F 11/02* (2013.01); *C05F 11/08* (2013.01); *C05F 17/00* (2013.01); *C05G 3/00* (2013.01)

(58) Field of Classification Search
CPC .......... A23K 50/10; A23K 10/18; C05F 9/04; C05F 11/02; C05F 17/00; C05F 11/08; A01N 63/30; C05G 3/00; Y02W 30/40; Y02P 20/145; Y02A 40/20
See application file for complete search history.

(56) References Cited

U.S. PATENT DOCUMENTS

| 2,761,806 A | 9/1956 | Boyer et al. |
|---|---|---|
| 4,705,780 A | 11/1987 | Massot et al. |
| (Continued) | | |

FOREIGN PATENT DOCUMENTS

| AU | 2012244300 A1 | 5/2014 |
|---|---|---|
| CN | 108611287 A | 10/2018 |

OTHER PUBLICATIONS

Hashem et al. 2008 Biocontrol Science and Technology, VBol. 18, No. 4 357-375 (Year: 2008).*

(Continued)

*Primary Examiner* — Olivia M. Wise
*Assistant Examiner* — Anjali Ajit Hirani
(74) *Attorney, Agent, or Firm* — Blank Rome LLP

(57) ABSTRACT

Methods for controlling pathogenic plant nematodes using organic soil amendments applied to soil and/or plants, methods of improving the performance and/or improving the health of a ruminant animal and methods of decreasing nematodes in a ruminant animal are described.

21 Claims, 2 Drawing Sheets

(51) Int. Cl.
    *A01N 63/32*     (2020.01)
    *A01N 63/38*     (2020.01)

(56) References Cited

U.S. PATENT DOCUMENTS

| | | | |
|---|---|---|---|
| 5,057,141 A * | 10/1991 | Rodriquez-Kabana ... | C05F 1/00 71/28 |
| 5,643,568 A | 7/1997 | Wolstrup et al. | |
| 8,790,436 B2 * | 7/2014 | Ersek .................. | C05F 17/10 71/6 |
| 2004/0170609 A1 | 9/2004 | Chen | |
| 2012/0090365 A1 * | 4/2012 | Ersek .................. | C05F 17/10 71/7 |
| 2016/0278385 A1 | 9/2016 | Rees et al. | |

OTHER PUBLICATIONS

Belda et. al. 2017. Toxins. 9, 112, 1-28 (Year: 2017).*
Golf Support, The Main Types of Grass in Golf, Feb. 15, 2017, https://golfsupport.com/blog/main-types-grass-golf/ (Year: 2017).*
Belda, et al., The Biology of Pichia membranifaciens Killer Toxins, *Toxins*, 2017, 9(4),112; doi:10.3390/toxins9040112.
International Search Report issued in PCT/US18/42111 dated Sep. 20, 2018.
CA Supplementary European Search Report issued in 18832838.9 dated Jul. 6, 2021.
CA Supplemental Partial European Search Report issued in EP18832838 dated Mar. 24, 2021.

* cited by examiner

METHODS FOR CONTROLLING PATHOGENIC PLANT NEMATODES AND FOR IMPROVING THE HEALTH AND/OR PERFORMANCE OF RUMINANT ANIMALS

This application claims the benefit of U.S. Provisional Application No. 62/531,910, filed Jul. 13, 2017, which is hereby incorporated by reference in its entirety.

FIELD OF THE INVENTION

The present invention relates to methods for controlling pathogenic plant nematodes using organic soil amendments. The invention also relates to a method of using organic soil amendments as probiotics in animal feed, to a method of improving the performance and/or improving the health of a ruminant animal and to a method of decreasing nematodes in a ruminant animal.

BACKGROUND OF THE INVENTION

Plant parasitic nematodes are among the most widespread pests, and are frequently one of the most insidious and costly. Webster J M (1987), Introduction to Brown R H, Kerry B R (Eds) Principles and practice of nematode control in crops, Academic Press, Melbourne, pages 1-12. Nematodes feed on plant roots, damage them, and drain nutrients from the plant, thereby decreasing yields and increasing the plant's susceptibility to other stresses. In the tropical and sub-tropical climates, crop production losses attributable to nematodes have been estimated at 14.6% compared with 8.8% in developed countries. One difficulty with assessing nematode impact is that damage resulting from nematode infection is often less obvious than that caused by many other pests or diseases. Losses that result from nematode attack may not necessarily be a consequence of direct cell death, necrosis or 'diseased' tissue, but may derive from other more insidious aspects, such as interference with the root system, reducing their efficiency in terms of access and uptake of nutrients and water. To the unaware, nematode-affected plants present typical drought and nutrient stress symptoms, which are easily and often misdiagnosed.

There are over 4,100 known species of plant parasitic nematodes with many more unidentified. See, e.g., Decraemer W, Hunt D J (2006), "Structure and classification", in Perry R N, Moens M (eds), Plant nematology, CABI Publishing, Wallingford, pages 3-32. In the United States, a survey of 35 states on various crops indicated nematode-derived losses of up to 25%. Koenning et al., *J. Nematol.*, 31(4S), 587-618 (1999). More recently, global crop losses due to nematode attack have been estimated to be $80 billion annually, which, given the more subtle effects of low infestation levels is probably a vast underestimate. Indirect losses are caused by nematodes creating wounds to plant roots that result in an entry for infection by plant parasitic fungi, archaea and bacteria. Sidhu et al., *J. Hered.*, 65, 153-156 (1974). An effect of global warming will be to warm soils thus providing a more favorable environment for species previously not endemic to certain areas and causing increased nematode losses globally. De Waele et al., *Ann. Rev. Phytopathol.*, 45, 457-85 (2007).

The plant parasitic nematodes of economic importance can be grouped into relatively restricted specialized groups that either cause direct damage to their host or act as virus vectors (Table 1). Most affect crops through feeding on or in plant roots, while a minority are aerial feeders. In addition to direct feeding and migration damage, nematode feeding facilitates subsequent infestation by secondary pathogens, such as parasitic fungi and bacteria. Powell N T (1971) "Interaction of plant parasitic nematodes with other disease-causing agents", in Zuckerman B M, Mai W F, Rohde R A (Eds.), Plant Parasitic Nematodes, Vol. 2, Academic Press Inc., London, pages 119-136. Nematodes are also troublesome for ruminant animals such as cattle, sheep and goats.

TABLE 1

World Food Production for Major Food Commodities and Main Nematode Pests of Importance.

| Crop | Total Production (Million Metric Tons) | Main Nematode Pests* (Luc et al., 2005; Evans et al., 1993; McDonald et al., 2005; Nicol et al., 2007) |
|---|---|---|
| Coarse Grains | 856.2 | |
| Maize (*Zea mays*) | 681.5 | *Meloidogyne* spp., *Pratylenchus* spp., *Heterodera* spp., *Punctodera chalcoensis*, *Paratrichodorus* spp., *Longidorus breviannulatus* |
| Barley (*Hordeum vulgare*) | 92.3 | *Heterodera avenae*, *Meloidogyne* spp., *Anguina tritici*, *Pratylenchus* spp. |
| Sorghum (*Sorghum bicolor*) | 49.4 | *Belonolaimus longicaudatus*, *Paratrichodorus* spp., *Pratylenchus* spp., *Criconemella* spp. |
| Oats (*Avena sativa*) | 19.3 | *Heterodera avenae*, *Meloidogyne* spp., *Ditylenchus dipsaci*, *Pratylenchus* spp. |
| Rye (*Secale cereale*) | 13.7 | *Anguina tritici*, *Heterodera avenae*, *Pratylenchus zeae* |
| Rice (*Oryza sativa*) | 621.6 | *Ditylenchus angustus*, *Aphelenchoides besseyi*, *Heterodera* spp., *Meloidogyne* spp., *Hirschmanniella* spp., *Pratylenchus* spp. |
| Roots & Tubers | 554.5 | |
| Potatoes (*Solanum tuberosum*) | 255.8 | *Globodera* spp., *Meloidogyne* spp., *Nacobbus aberrans*, *Pratylenchus* spp., *Trichodorus* spp., |
| Cassava (*Manihot esculenta*) | 203.6 | *Pratylenchus brachyurus*, *Rotylenchus reniformis*, *Helicotylenchus* spp., *Meloidogyne* spp., *Scutellonema bradys* |

TABLE 1-continued

World Food Production for Major Food Commodities and Main Nematode Pests of Importance.

| Crop | Total Production (Million Metric Tons) | Main Nematode Pests* (Luc et al., 2005; Evans et al., 1993; McDonald et al., 2005; Nicol et al., 2007) |
| --- | --- | --- |
| Sweet potatoes (*Ipomoea batatas*) | 95.1 | *Meloidogyne* spp., *Pratylenchus* spp., *Rotylenchus reniformis, Ditylenchus destructor* |
| Wheat (*Triticum aestivum*) | 525.8 | *Heterodera* spp., *Pratylenchus* spp., *Meloidogyne* spp., *Anguina tritici, Ditylenchus dipsaci* |
| Oil crops | 291.2 | *Meloidogyne* spp., *Heterodera glycines, Rotylenchulus reniformis, Hoplolaimus columbus, Pratylenchus* spp. |
| Soybeans (*Glycine max*) | 217.3 | |
| Rapeseed (*Brassica napus*) | 48.7 | *Heterodera schachtii* |
| Sunflower seed (*Helianthus* spp.) | 25.2 | *Meloidogyne* spp. |

Luc M, Sikora R, Bridge J (Eds.) (2005), *Plant parasitic nematodes in subtropical and tropical agriculture*, 2$^{nd}$ Ed., CABI Boiscience, Egham Surrey, page 896; Evans E, Trudgill D L, Webster J M (Eds.) (1993), *Plant parasitic nematodes in temperate agriculture*, CABI Publishing, Wallingford, page 648; McDonald A H, Nicol J M (2005), "Nematode parasites of cereals", in Luc M, Sikora R A, Bridge J (Eds.), *Plant parasitic nematodes in subtropical and tropical agriculture*, CABI Publishing, Wallingford, pages 131-191; Nicol J M, Rivoal R (2007), "Integrated management and biocontrol of vegetable and grain crops nematodes", in Ciancio A, Mukerji K G (Eds), *Global knowledge and its application for the integrated control and management of nematodes on wheat*, Springer, The Netherlands, pages 243-287.

Chemical treatments (nematicides) to control nematodes are extremely expensive for farmers and growers. Additionally, chemicals for controlling nematodes are being eliminated from use due to environmental concerns. This will increase the opportunity for plant parasitic nematodes to create problems for farmers. Farmers will shift their agricultural practices and crop production will move to areas that currently do not have nematode populations. All this will result in economic loss to farmers and higher costs for consumers.

There is therefore a need for new methods for controlling pathogenic plant nematodes in crops.

SUMMARY OF THE INVENTION

The inventors surprisingly discovered that certain organic soil amendments are able to control plant pathogenic nematodes thereby enhancing yield and quality of crops and providing improved feed for ruminant animals.

One embodiment of the present invention is a method of controlling, inhibiting or suppressing plant pathogenic nematodes comprising applying (for example, by spraying) an organic soil amendment to nematodes or a crop and/or soil surrounding the nematodes. The organic soil amendment may be a liquid. The nematodes to be controlled, inhibited, or suppressed may be, for example, lance, sting, root-knot and cyst nematodes. Other nematodes to be controlled, inhibited, or suppressed may be ectoparasites (such as *Belonolaimus* (order Rhabditida), *Xiphenema* (order Dorylaimida), and *Trichodorus* (order Triplonchida)), semi-endoparasites (such as *Rotylenchulus* (order Rhabditida) and *Tylenchulus* (order Rhabditida)), migratory endoparasites (such as *Pratylenchus* (order Rhabditida) and *Radopholus* (order Rhabditida)), sedentary endoparasites (such as *Meloidogyne* (order Rhabditida), *Heterodera* (order Rhabditida), and *Naccobus* (order Rhabditida)), stem and bulb nematodes (such as *Bursaphelenchus* (order Rhabditida) and *Ditylenchus* (order Rhabditida)), seed gall nematodes (such as *Anguina* (order Rhabditida)), and foliar nematodes (such as *Aphelenchoides* (order Rhabditida)). In one embodiment, an effective amount of the organic soil amendment is applied to control, inhibit, or suppress the nematodes.

Another embodiment is a method of controlling, inhibiting or suppressing plant pathogenic nematodes on a crop comprising applying (for example, by spraying) an organic soil amendment to the crop and/or the surrounding soil (i.e., the soil surrounding the crop). The organic soil amendment may be a liquid. The nematodes to be controlled, inhibited, or suppressed may be, for example, lance, sting, root-knot and cyst nematodes as well as those listed above. In one embodiment, an effective amount of the organic soil amendment is applied to control, inhibit, or suppress the nematodes.

Yet another embodiment is a method of suppressing nematode egg hatching comprising applying (for example, by spraying) an organic soil amendment to the nematode eggs or a crop and/or soil surrounding the nematode eggs. The organic soil amendment may be a liquid. The nematode eggs may be, for example, those of lance, sting, root-knot or cyst nematodes as well as those listed above.

Yet another embodiment is a method of suppressing, modulating, or inhibiting the sensory organs of juvenile nematodes applying (for example, by spraying) an organic soil amendment to the nematodes or a crop and/or soil surrounding the nematodes. The organic soil amendment may be a liquid. The nematodes may be, for example, lance, sting, root-knot and cyst nematodes as well as those listed above.

Yet another embodiment is a method of controlling, inhibiting or suppressing plant pathogenic nematodes comprising applying (for example, by spraying) *Pichia fermentans, Pichia membranifaciens*, or both to nematodes or a crop and/or soil surrounding the nematodes. The *Pichia fermentans, Pichia membranifaciens*, or both may be provided in the form of an organic soil amendment. In one embodiment, an effective amount of the *Pichia fermentans*,

*Pichia membranifaciens*, or combination thereof is applied to control, inhibit, or suppress the nematodes.

Yet another embodiment is a method of controlling, inhibiting or suppressing plant pathogenic nematodes on a crop comprising applying (for example, by spraying) *Pichia fermentans*, *Pichia membranifaciens*, or both to the crop and/or the surrounding soil (i.e., the soil surrounding the crop). The *Pichia fermentans*, *Pichia membranifaciens*, or both may be provided in the form of an organic soil amendment. In one embodiment, an effective amount of the *Pichia fermentans*, *Pichia membranifaciens*, or combination thereof is applied to control, inhibit, or suppress the nematodes. The nematodes to be controlled, inhibited, or suppressed may be, for example, lance, sting, root-knot and cyst nematodes as well as those listed above. In one embodiment, an effective amount of *Pichia fermentans*, *Pichia membranifaciens*, or both is applied to control, inhibit, or suppress the nematodes.

Yet another embodiment is a method of suppressing nematode egg hatching comprising applying (for example, by spraying) *Pichia fermentans*, *Pichia membranifaciens*, or both to the nematode eggs or a crop and/or soil surrounding the nematode eggs. The nematode eggs may be, for example, those of lance, sting, root-knot or cyst nematodes as well as those listed above. The *Pichia fermentans*, *Pichia membranifaciens*, or both may be provided in the form of an organic soil amendment. In one embodiment, an effective amount of the *Pichia fermentans*, *Pichia membranifaciens*, or combination thereof is applied to control, inhibit, or suppress the nematodes.

Yet another embodiment is a method of suppressing, modulating, or inhibiting the sensory organs of juvenile nematodes applying (for example, by spraying) *Pichia fermentans*, *Pichia membranifaciens*, or both to the nematodes or a crop and/or soil surrounding the nematodes. The nematodes may be, for example, lance, sting, root-knot and cyst nematodes as well as those listed above. The *Pichia fermentans*, *Pichia membranifaciens*, or both may be provided in the form of an organic soil amendment. In one embodiment, an effective amount of the *Pichia fermentans*, *Pichia membranifaciens*, or combination thereof is applied to control, inhibit, or suppress the nematodes.

In one embodiment, the liquid organic soil amendment is applied to agricultural crops. Suitable agricultural crops include, but are not limited to maize, barley, sorghum, oats, rye, rice, potatoes, forage, cassava, sweet potatoes, wheat, soybeans, rapeseed, sunflower seed, alfalfa, citrus, corn, cotton, peanuts, rice, sugar beet, tobacco, soy, tomatoes, and any combination of any of the foregoing.

In one embodiment, about 0.1 to about 10 gallons per acre of the organic soil amendment is applied to the crops, for instance, at planting placed in the seed row (in-furrow) or in a liquid band, such as to the side and below the seed (e.g., a liquid band 2 inches to the side and below the seed). In another embodiment, about 0.2 or 0.3 to about 5 or 6 gallons per acre are applied to the crops, for instance, at planting placed in the seed row (in-furrow). In one embodiment, about 0.4, 0.5, or 0.6 gallons per acre of the organic soil amendment is applied to the crops.

In one preferred embodiment, the organic soil amendment includes (i) black yeast, (ii) *Pichia fermentans*, and (iii) *Pichia membranifaciens*. In another embodiment, the organic soil amendment includes (i) *Pichia fermentans* and (ii) *Pichia membranifaciens*.

In one preferred embodiment, a liquid organic soil amendment is applied to the crop and/or the surrounding soil where (i) the liquid soil amendment is prepared by diluting (such as with water) a liquid concentrated organic soil amendment, and (ii) the liquid concentrated organic soil amendment is prepared by:

(a) producing an initial extract from a compost having live beneficial microorganisms by soaking the compost in water;

(b) mixing the initial extract with additional water and recirculating the mixture;

(c) aerating the mixture following step (b);

(d) adding a supplemented medium or media to the mixture to feed the live beneficial microorganisms and promote their growth during the aerating step;

(e) introducing additives and beneficial microorganisms (such as archaea, bacteria, protozoa and/or nematodes) to the mixture, and (f) optionally refrigerating the mixture, wherein the mixture formed by this process is a liquid concentrated organic soil amendment.

In one embodiment, the beneficial microorganisms at least include beneficial bacteria.

In one embodiment, the initial extract is produced by soaking a compost comprising plant waste, and free of manure.

In another embodiment, the initial extract is produced by soaking a compost further comprising shellfish shells. In one embodiment, the initial extract comprises about 0.5 to about 1.5% by weight of shellfish shells. In another embodiment, the shellfish shells comprises oyster shell, crab shell, shrimp shell, or any combination of any of the foregoing.

In another embodiment, the initial extract is produced by soaking the compost in water for about 1-3 days at a temperature typically not exceeding about 120° F.

In one embodiment, the recirculation is for about 1-2 days at a temperature typically not exceeding about 120° F.

In one embodiment, the aerating of the mixture is for about 2-24 hours at a temperature typically not exceeding about 120° F.

In one embodiment, the beneficial microorganisms (such as beneficial bacteria) are derived at least in part from a compost comprising green and brown plant waste, and are free of manure.

In one embodiment, the beneficial bacterial comprises beneficial fungi. In one embodiment, the beneficial fungi comprise chitin degrading fungi.

In one embodiment, the beneficial fungi comprise mycorrhizae fungi, *Trichoderma* fungi, or any combination of any of the foregoing.

In one embodiment, the mycorrhizae fungi comprise *Glomus intrardices*, *G. mosseae*, *G. aggregatum*, *G. etunicatum*, *G. deserticola*, *G. monosporum*, *G. clarum*, *G. brasilianum*, *Gigaspora margarita*, *Rhizopogon villosullus*, *R. luteolus*, *R. amylopogon*, *R. fulvigleba*, *Pisolithus tinctorius*, *Suillus granulates*, *S. puctatipies*, *Laccaria laccata*, *Scleroderma cepa*, *S. citrinum*, or any combination of any of the foregoing.

In one embodiment, the *Trichoderma* fungi is *T. harianum*.

In a further embodiment, the liquid concentrated organic soil amendment further comprises *Penicilium* fungi, *Actinobacteria*, and nitrogen fixing bacteria.

In one embodiment, the supplemented medium comprises molasses, yeast extract, yucca extract, or any combination of any of the foregoing. The total amount of the molasses, yeast extract, yucca extract, or any combination of any of the foregoing, may be about 6 to about 11% by volume.

In one embodiment, the additives comprise a supplemented medium or a plant extract. In one embodiment, the plant extract is tea tree oil. In one embodiment, the additive comprises tea tree oil at about 0.0025% by volume.

In a further embodiment, the additives comprise humic acid, fulvic acid, or any combination of any of the foregoing. In one embodiment, the additive comprises humic acid, fulvic acid, or any combination of any of the foregoing at about 0.0008% by volume.

In a further embodiment, the process for producing the liquid concentrated organic soil amendment further comprises refrigerating the mixture at a temperature between about 32 and about 44° F.

In a further embodiment, the process for producing the liquid concentrated organic soil amendment further comprises freezing the mixture.

Another embodiment of the present invention is a method of controlling, inhibiting or suppressing plant pathogenic nematodes on grass (for example, turf grass) comprising applying (for example, by spraying) an organic soil amendment to the grass and/or the surrounding soil (i.e., the soil surrounding the grass). The organic soil amendment may be a liquid. Non-limiting examples of grass include, but are not limited to, St. Augustine Grass (*Stenotaphrum secundatum*), Bermudagrass (*Cynodon dactylon*), Bahiagrass (*Paspalum notatum*), Centipede Grass (*Eremochloa ophiuroides*), Buffalo Grass (*Bouteloua dactyloides*), Zoysia Grass (*Zoysia matrella*), Bentgrass (*Agrostis stolonifera*), Kentucky Bluegrass (*Poa pratensis*), Rough Bluegrass (*P. trivalis*), Red Fescue (*Festuca arundinacea*), Annual Ryegrass (*Lolium multiflorum*), Perennial Ryegrass (*L. perenne*), Tall Fescue (*Festuca arundinacea*), and Carpetgrass (*Axonopus fisifolius*). In one embodiment, an effective amount of the soil amendment is applied to control, inhibit, or suppress the nematodes.

Yet another embodiment is a method of controlling, inhibiting or suppressing plant pathogenic nematodes on grass (for example, turf grass) comprising applying (for example, by spraying) *Pichia fermentans, Pichia membranifaciens*, or both to the grass and/or the surrounding soil (i.e., the soil surrounding the grass). Non-limiting examples of grass include, but are not limited to, St. Augustine Grass (*Stenotaphrum secundatum*), Bermudagrass (*Cynodon dactylon*), Bahiagrass (*Paspalum notatum*), Centipede Grass (*Eremochloa ophiuroides*), Buffalo Grass (*Bouteloua dactyloides*), Zoysia Grass (*Zoysia matrella*), Bentgrass (*Agrostis stolonifera*), Kentucky Bluegrass (*Poa pratensis*), Rough Bluegrass (*P. trivalis*), Red Fescue (*Festuca arundinacea*), Annual Ryegrass (*Lolium multiflorum*), Perennial Ryegrass (*L. perenne*), Tall Fescue (*Festuca arundinacea*), and Carpetgrass (*Axonopus fisifolius*). In one embodiment, an effective amount of the *Pichia fermentans, Pichia membranifaciens*, or combination thereof is applied to control, inhibit, or suppress the nematodes.

Another embodiment of the present invention is a method of improving the performance and/or health of a ruminant animal by (i) applying an organic soil amendment (such as the liquid organic soil amendment described herein) to the crops or the surrounding soil which are used as feed for the ruminant animal or (ii) adding an organic soil amendment (such as the liquid organic soil amendment described herein) to the feed for the ruminant animal. The method may further include permitting the ruminant animal to graze on the crops produced with the organic soil amendment. This method reduces the number of nematodes (and especially harmful nematodes) ingested by the ruminant animal. The organic soil amendment may be prepared by any method described herein. Ruminant animals include, but are not limited to, cattle (e.g., cows), sheep and goats. In one embodiment, an effective amount of the organic soil amendment is applied to control, inhibit, or suppress nematodes in the crops or feed.

Yet another embodiment is a method of improving the performance and/or health of a ruminant animal by (i) applying *Pichia fermentans, Pichia membranifaciens*, or both to the crops or the surrounding soil which are used as feed for the ruminant animal or (ii) adding *Pichia fermentans, Pichia membranifaciens*, or both to the feed for the ruminant animal. The method may further include permitting the ruminant animal to graze on the crops produced with *Pichia fermentans, Pichia membranifaciens*, or both. This method reduces the number of nematodes (and especially harmful nematodes) ingested by the ruminant animal. Ruminant animals include, but are not limited to cattle (e.g., cows), sheep and goats. In one embodiment, an effective amount of *Pichia fermentans, Pichia membranifaciens*, or both is applied to control, inhibit, or suppress nematodes in the crops or feed.

In one embodiment, the improvement in the performance and/or health of the ruminant animal results in higher milk yield from the animal, weight gain of the animal, or any combination of any of the foregoing.

Yet another embodiment is a method of decreasing nematodes in a ruminant animal by applying an organic soil amendment (such as the liquid organic soil amendment described herein) to the crops or the surrounding soil which are used as feed for the ruminant animal. The method may further include permitting the ruminant animal to graze on the crops produced with the organic soil amendment. The organic soil amendment may be prepared by any method described herein. In one embodiment, an effective amount of the organic soil amendment is applied to control, inhibit, or suppress nematodes in the crops or feed.

Yet another embodiment is a method of decreasing nematodes in a ruminant animal by applying *Pichia fermentans, Pichia membranifaciens*, or both to the crops or the surrounding soil which are used as feed for the ruminant animal. The method may further include permitting the ruminant animal to graze on the crops produced with *Pichia fermentans, Pichia membranifaciens*, or both. In one embodiment, an effective amount of *Pichia fermentans, Pichia membranifaciens*, or both is applied to control, inhibit, or suppress nematodes in the crops or feed.

In one embodiment, the methods described herein do not include applying any synthetic nematicides to the crops. In yet another embodiment, for crops which are currently treated with synthetic nematicides, the treatment is discontinued and the application of the organic soil amendment is begun.

In another embodiment, the organic soil amendment is applied or added directly to animal feed prior to feeding to ruminant animals.

DETAILED DESCRIPTION OF THE INVENTION

Methods for Controlling Nematodes

Figure 1:
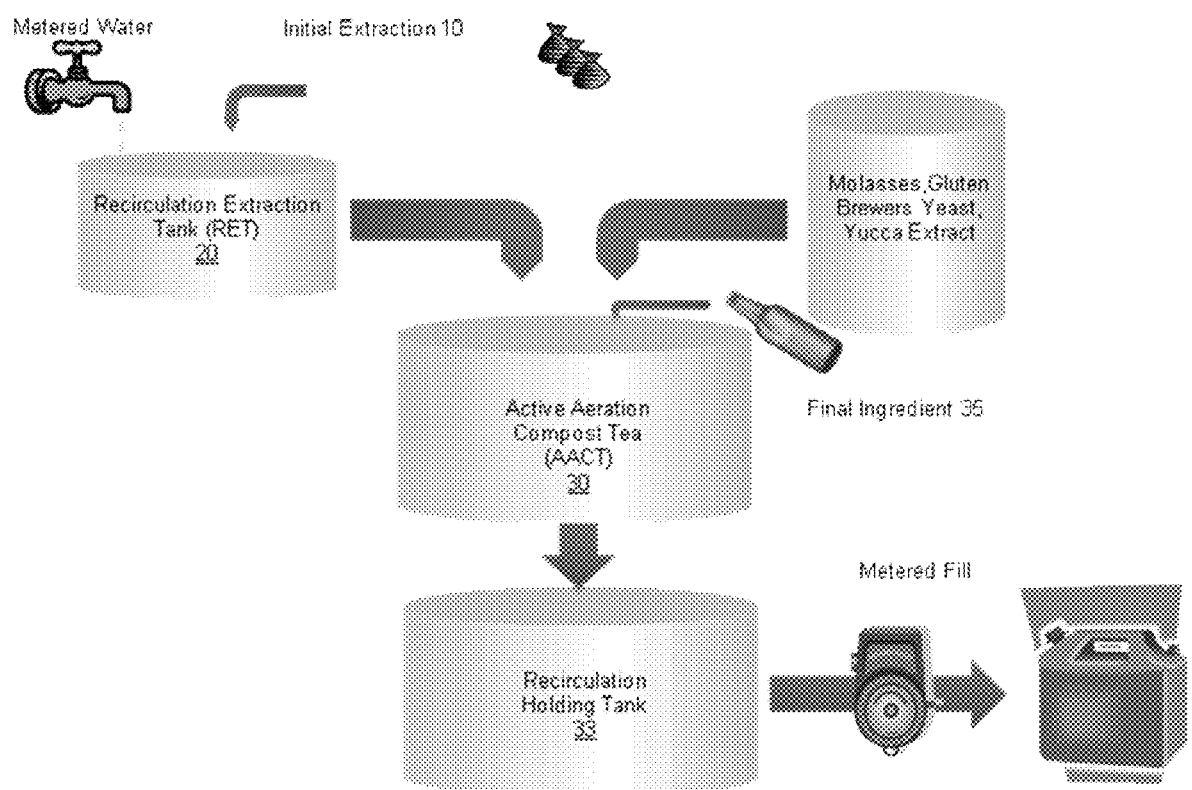
FIG. 1 is a flow chart of a method of producing an organic soil amendment.

The inventors surprisingly discovered that certain organic soil amendments are able to control, suppress, inhibit, and/or repel plant pathogenic nematodes thereby enhancing yield and quality of crops and providing improved feed for rumen.

One embodiment of the present invention is a method of controlling, inhibiting or suppressing plant pathogenic nematodes comprising applying (for example, by spraying) an organic soil amendment to nematodes or a crop and/or soil surrounding the nematodes. The organic soil amendment may be a liquid. The nematodes to be controlled, inhibited, or suppressed may be, for example, lance, sting, root-knot and cyst nematodes. Other nematodes to be controlled, inhibited, or suppressed may be ectoparasites (such as *Belonolaimus* (order Rhabditida), *Xiphenema* (order Dorylaimida), and *Trichodorus* (order Triplonchida)), semi-endoparasites (such as *Rotylenchulus* (order Rhabditida) and *Tylenchulus* (order Rhabditida)), migratory endoparasites (such as *Pratylenchus* (order Rhabditida) and *Radopholus* (order Rhabditida)), sedentary endoparasites (such as *Meloidogyne* (order Rhabditida), *Heterodera* (order Rhabditida), and *Naccobus* (order Rhabditida)), stem and bulb nematodes (such as *Bursaphelenchus* (order Rhabditida) and *Dhylenchus* (order Rhabditida)), seed gall nematodes (such as *Anguina* (order Rhabditida)), and foliar nematodes (such as *Aphelenchoides* (order Rhabditida)).

Another embodiment is a method of controlling, inhibiting or suppressing plant pathogenic nematodes on a crop comprising applying (for example, by spraying) an organic soil amendment to the crop and/or the surrounding soil (i.e., the soil surrounding the crop). The organic soil amendment may be a liquid. The nematodes to be controlled, inhibited, or suppressed may be, for example, lance, sting, root-knot and cyst nematodes as well those listed above.

Yet another embodiment is a method of controlling, inhibiting or suppressing plant pathogenic nematodes comprising applying (for example, by spraying) *Pichia fermentans, Pichia membranifaciens*, or both to nematodes or a crop and/or soil surrounding the nematodes. The *Pichia fermentans, Pichia membranifaciens*, or both may be provided in the form of an organic soil amendment. In one embodiment, an effective amount of the *Pichia fermentans, Pichia membranifaciens*, or combination thereof is applied to control, inhibit, or suppress the nematodes.

Yet another embodiment is a method of controlling, inhibiting or suppressing plant pathogenic nematodes on a crop comprising applying (for example, by spraying) *Pichia fermentans, Pichia membranifaciens*, or both to the crop and/or the surrounding soil (i.e., the soil surrounding the crop). The *Pichia fermentans, Pichia membranifaciens*, or both may be provided in the form of an organic soil amendment. In one embodiment, an effective amount of the *Pichia fermentans, Pichia membranifaciens*, or combination thereof is applied to control, inhibit, or suppress the nematodes. The nematodes to be controlled, inhibited, or suppressed may be, for example, lance, sting, root-knot and cyst nematodes as well as those listed above. In one embodiment, an effective amount of *Pichia fermentans, Pichia membranifaciens*, or both is applied to control, inhibit, or suppress the nematodes.

The soil amendment and *Pichia fermentans, Pichia membranifaciens*, or both are effective in controlling, inhibiting and suppressing the nematodes listed in Table 1 above and Table 2 below.

TABLE 2

Additional Specific Crops for Nematode Prevention and Treatment

| Crop | Nematode | Genus | Species | Damage |
|---|---|---|---|---|
| Alfalfa | Stem and Bulb nematode | *Ditylenchus* | *dipsaci* | feeds on the crown of plants, most damaging in cool, wet conditions - 1st and 2nd cutting |
| | Root-knot nematodes | *Meloidogyne* | *incognita* | feeds on many crop species, prefers 65 to 85° F., causes plant wilt diseases |
| | Peanut root-knot nematodes | *Meloidogyne* | *arenaria* | feeds on many crop species, prefers 65 to 85° F., causes plant wilt diseases |
| | Javanese root-knot nematodes | *Meloidogyne* | *javanica* | feeds on many crop species, prefers 41 to 77° F., causes plant wilt diseases |
| | Northern root-knot nematodes | *Meloidogyne* | *hapla* | feeds on many crop species, prefers 65 to 85° F., causes plant wilt diseases |
| | Root-knot nematodes | *Meloidogyne* | *chitwoodi* | feeds on many crop species, prefers 65 to 85° F., causes plant wilt diseases |
| Citrus | Sheath nematode | *Hemicyliophora* | *arenaria* | worldwide, only found in CA - quarantine in effect |
| | Citrus nematode | *Tylenchus* | *semipenetrans* | in 50 to 90% of the citrus producing areas of the world causing slow decline |
| Corn | Corn cyst nematode | *Heterodera* | *zea* | most damaging but very rare in USA |
| | Lance nematode | *Hoplolaimus* | *galeatus* | plants outgrow damage, but yield still reduced |
| | Needle nematode | *Longidorus* | *breviannulatus* | very large, stunt root systems can reduce yield by up to 60% |

TABLE 2-continued

Additional Specific Crops for Nematode Prevention and Treatment

| Crop | Nematode | Genus | Species | Damage |
|---|---|---|---|---|
| | Lesion nematodes | *Pratylenchus* | *zeae* | most economically destructive corn pest in USA |
| | Dagger nematode | *Xiphinema* | *americanum* | up to 15 species prefers sandy soil, controlled by tillage |
| Cotton | Sting nematode | *Belonolaimus* | *longicaudatus* | less damaging but present |
| | Columbia lance nematode | *Hoplolaimus* | *columbus* | southeast corner of USA, results in seedling diseases |
| | Root-knot nematode | *Meloidogyne* | *incognita* | prefers sandy soil, causes Fusarium wilt (Fusarium oxysporum) |
| | Lesion nematode | *Pratylenchus* | *brachyurus* | less damaging but present |
| | Reniform nematode | *Rotylenchulus* | *reniformis* | found in silty soils of the warmer areas of the USA cotton belt, results in seedling diseases |
| Peanut | Peanut root-knot nematode | *Meloidogyne* | *arenaria* | |
| | Northern root-knot nematode | *Meloidogyne* | *hapla* | |
| | Javanese root-knot nematode | *Meloidogyne* | *javanica* | |
| | Lesion nematode | *Pratylenchus* | *brachyurus* | |
| Potato | Potato rot nematonde | *Ditylenchus* | *destructor* | serious yield reduction |
| | Pale cyst nematode | *Globodera* | *palida* | devastating - complete crop failure |
| | Golden nematode | *Globodera* | | devastating - complete crop failure |
| | Columbia root-knot nematode | *Meloidogyne* | *chiiwoodi* | diminished tuber quality |
| | Northern root-knot nematodes | *Meloidogyne* | *hapla* | |
| Rice | White-tip of rice nematode | *Aphelenchoides* | *besseyi* | causes desiccation of leaf tips |
| | Sting nematode | *Belonolaimus* | *longicaudatus* | turf (Bermuda and ryegrass) blade desiccation, does effect certain crops |
| Soybean | Soybean cyst nematode | *Heterodera* | *glycines* | severe root damage leading to devastating yield loss |
| | Columbia lance nematode | *Hoplolaimus* | *columbus* | not totally devastating |
| | Root-knot nematode | *Meloidogyne* | *incognita* | not totally devastating |
| | Reniform nematode | *Rotylenchulus* | *reniformis* | not totally devastating |
| Sugarbeet | Root-knot nematode | *Meloidogyne* | *ingognita* | |
| Tobacco | Peanut root-knot nematode | *Meloidogyne* | *arenaria* | damage is rarely serious |
| | Northern root-knot nematode | *Meloidogyne* | *hapla* | damage is rarely serious |
| | Root-knot nematode | *Meloidogyne* | *ingognita* | damage is rarely serious |
| | Javanese root-knot nematode | *Meloidogyne* | *javanica* | damage is rarely serious |

The crops may be agricultural crops. Suitable agricultural crops include, but are not limited to maize, barley, sorghum, oats, rye, rice, potatoes, forage, cassava, sweet potatoes, wheat, soybeans, rapeseed, sunflower seed, alfalfa, citrus, corn, cotton, peanuts, rice, sugar beet, tobacco, soy, tomatoes, and any combination of any of the foregoing. In one embodiment, the crop is corn. In another embodiment, the crop is soybean. In yet another embodiment, the crop is turfgrass. In yet another embodiment, the crop is berries, grapes, banana, or strawberry. In yet another embodiment, the crop is beans or peas.

The phrase "controlling pathogenic plant nematodes" includes preventing, inhibiting, suppressing and/or repelling the amount of pathogenic plant nematode present, for example, in a crop, in the crop roots and/or in the soil surrounding the roots.

In one embodiment, the crop is soy. In another embodiment, the crop is corn. In yet another embodiment, the crop is tomatoes.

In one embodiment, the method is used to control, inhibit or suppress soybean cyst nematodes.

Yet another embodiment is a method of suppressing nematode egg hatching comprising applying (for example, by spraying) an organic soil amendment to the nematode eggs or a crop and/or soil surrounding the nematode eggs. The organic soil amendment may be a liquid. The nematode eggs may be, for example, those of lance, sting, root-knot or cyst nematodes. The crops may be agricultural crops. Suitable agricultural crops include, but are not limited to maize, barley, sorghum, oats, rye, rice, potatoes, forage, cassava, sweet potatoes, wheat, soybeans, rapeseed, sunflower seed, alfalfa, citrus, corn, cotton, peanuts, rice, sugar beet, tobacco, soy, tomatoes, and any combination of any of the foregoing. In one embodiment, the crop is corn. In another embodiment, the crop is soybean. In yet another embodiment, the crop is turfgrass. In yet another embodiment, the crop is berries, grapes, banana, or strawberry. In yet another embodiment, the crop is beans or peas.

Yet another embodiment is a method of suppressing nematode egg hatching comprising applying (for example, by spraying) *Pichia fermentans, Pichia membranifaciens*, or both to the nematode eggs or a crop and/or soil surrounding the nematode eggs. The organic soil amendment may be a liquid. The nematode eggs may be, for example, those of lance, sting, root-knot or cyst nematodes as well as those listed above. The *Pichia fermentans, Pichia membranifaciens*, or both may be provided in the form of an organic soil amendment. In one embodiment, an effective amount of the *Pichia fermentans, Pichia membranifaciens*, or combination thereof is applied to control, inhibit, or suppress the nematodes. The nematode eggs may be, for example, those of lance, sting, root-knot or cyst nematodes. The crops may be agricultural crops. Suitable agricultural crops include, but are not limited to maize, barley, sorghum, oats, rye, rice, potatoes, forage, cassava, sweet potatoes, wheat, soybeans, rapeseed, sunflower seed, alfalfa, citrus, corn, cotton, peanuts, rice, sugar beet, tobacco, soy, tomatoes, and any combination of any of the foregoing. In one embodiment, the crop is corn. In another embodiment, the crop is soybean. In yet another embodiment, the crop is turfgrass. In yet another embodiment, the crop is berries, grapes, banana, or strawberry. In yet another embodiment, the crop is beans or peas.

Yet another embodiment is a method of suppressing, modulating, or inhibiting the sensory organs of juvenile nematodes applying (for example, by spraying) an organic soil amendment to the nematodes or a crop and/or soil surrounding the nematodes. The organic soil amendment may be a liquid. The nematodes may be, for example, lance, sting, root-knot and cyst nematodes. The crops may be agricultural crops. Suitable agricultural crops include, but are not limited to maize, barley, sorghum, oats, rye, rice, potatoes, forage, cassava, sweet potatoes, wheat, soybeans, rapeseed, sunflower seed, alfalfa, citrus, corn, cotton, peanuts, rice, sugar beet, tobacco, soy, tomatoes, and any combination of any of the foregoing. In one embodiment, the crop is corn. In another embodiment, the crop is soybean. In yet another embodiment, the crop is turfgrass. In yet another embodiment, the crop is berries, grapes, banana, or strawberry. In yet another embodiment, the crop is beans or peas.

Yet another embodiment is a method of suppressing, modulating, or inhibiting the sensory organs of juvenile nematodes applying (for example, by spraying) *Pichia fermentans, Pichia membranifaciens*, or both to the nematodes or a crop and/or soil surrounding the nematodes. The nematodes may be, for example, lance, sting, root-knot and cyst nematodes as well as those listed above. The *Pichia fermentans, Pichia membranifaciens*, or both may be provided in the form of an organic soil amendment. In one embodiment, an effective amount of the *Pichia fermentans, Pichia membranifaciens*, or combination thereof is applied to control, inhibit, or suppress the nematodes. The nematodes may be, for example, lance, sting, root-knot and cyst nematodes. The crops may be agricultural crops. Suitable agricultural crops include, but are not limited to maize, barley, sorghum, oats, rye, rice, potatoes, forage, cassava, sweet potatoes, wheat, soybeans, rapeseed, sunflower seed, alfalfa, citrus, corn, cotton, peanuts, rice, sugar beet, tobacco, soy, tomatoes, and any combination of any of the foregoing. In one embodiment, the crop is corn. In another embodiment, the crop is soybean. In yet another embodiment, the crop is turfgrass. In yet another embodiment, the crop is berries, grapes, banana, or strawberry. In yet another embodiment, the crop is beans or peas.

Yet another embodiment of the present invention is a method of controlling, inhibiting or suppressing plant pathogenic nematodes on grass comprising applying (for example, by spraying) an organic soil amendment to the grass and/or the surrounding soil (i.e., the soil surrounding the grass). The organic soil amendment may be a liquid. Non-limiting examples of grass include, but are not limited to, St. Augustine Grass (*Stenotaphrum secundatum*), Bermudagrass (*Cynodon dactylon*), Bahiagrass (*Paspalum notatum*), Centipede Grass (*Eremochloa ophiuroides*), Buffalo Grass (*Bouteloua dactyloides*), Zoysia Grass (*Zoysia matrella*), Bentgrass (*Agrostis stolonifera*), Kentucky Bluegrass (*Poa pratensis*), Rough Bluegrass (*P. trivalis*), Red Fescue (*Festuca arundinacea*), Annual Ryegrass (*Lolium multiflorum*), Perennial Ryegrass (*L. perenne*), Tall Fescue (*Festuca arundinacea*), and Carpetgrass (*Axonopus fisifolius*). In one embodiment, an effective amount of the soil amendment is applied to control, inhibit, or suppress the nematodes.

Yet another embodiment is a method of controlling, inhibiting or suppressing plant pathogenic nematodes on grass (for example, turf grass) comprising applying (for example, by spraying) *Pichia fermentans, Pichia membranifaciens*, or both to the grass and/or the surrounding soil (i.e., the soil surrounding the grass). Non-limiting examples of grass include, but are not limited to, St. Augustine Grass (*Stenotaphrum secundatum*), Bermudagrass (*Cynodon dactylon*), Bahiagrass (*Paspalum notatum*), Centipede Grass (*Eremochloa ophiuroides*), Buffalo Grass (*Bouteloua dactyloides*), Zoysia Grass (*Zoysia matrella*), Bentgrass (*Agrostis stolonifera*), Kentucky Bluegrass (*Poa pratensis*), Rough Bluegrass (*P. trivalis*), Red Fescue (*Festuca arundinacea*), Annual Ryegrass (*Lolium multiflorum*), Perennial Ryegrass (*L. perenne*), Tall Fescue (*Festuca arundinacea*), and Carpetgrass (*Axonopus fisifolius*). In one embodiment, an effective amount of the *Pichia fermentans, Pichia membranifaciens*, or combination thereof is applied to control, inhibit, or suppress the nematodes.

In one embodiment, about 0.1 to about 10 gallons per acre of the organic soil amendment is applied to the crops, for instance, at planting placed in the seed row (in-furrow). In another embodiment, about 0.2 or 0.3 to about 5 or 6 gallons per acre are applied to the crops, for instance, at planting placed in the seed row (in-furrow). In one embodiment, about 0.4, 0.5, or 0.6 gallons per acre of the organic soil amendment is applied to the crops.

In one embodiment, the crop is grass and about from about 1 to about 4 gallons per acre of the organic soil amendment is applied. For example, about 2 to about 3 gallons per acre of the organic soil amendment, such as about 2.0, about 2.25, about 2.5, or about 2.75 gallons per acre of the organic soil amendment, can be applied.

Non-limiting examples of grass include, but are not limited to, St. Augustine Grass (*Stenotaphrum secundatum*), Bermudagrass (*Cynodon dactylon*), Bahiagrass (*Paspalum notatum*), Centipede Grass (*Eremochloa ophiuroides*), Buffalo Grass (*Bouteloua dactyloides*), *Zoysia* Grass (*Zoysia matrella*), Bentgrass (*Agrostis stolonifera*), Kentucky Bluegrass (*Poa pratensis*), Rough Bluegrass (*P. trivalis*), Red Fescue (*Festuca arundinacea*), Annual Ryegrass (*Lolium multiflorum*), Perennial Ryegrass (*L. perenne*), Tall Fescue (*Festuca arundinacea*), and Carpetgrass (*Axonopus fisifolius*).

Methods for Enhancing Rumen Production

Another embodiment is a method for improving the performance of a ruminant animal, such as by providing higher milk yield and/or weight gain, by (i) applying an organic soil amendment (such as the liquid organic soil amendment described herein) to the crops or the surrounding soil which are used as feed for the ruminant animal or (ii) adding an organic soil amendment (such as the liquid organic soil amendment described herein) to the feed for the ruminant animal. The method may further include permitting the ruminant animal to graze on the crops produced with the organic soil amendment. This method reduces the number of nematodes ingested by the ruminant animal. The organic soil amendment may be prepared by any method described herein. Ruminant animals include, but are not limited to cattle and cows, sheep, goats and other pasturing animals.

In one embodiment, the improvement in the performance and/or health of the ruminant animal results in higher milk yield from the animal, weight gain of the animal, or any combination of any of the foregoing.

The organic soil amendment described herein may contain a complex population of bacteria that could contain as many as 800 to over 2,000 individual species present. Many of these species are also found in the rumen of ruminant animals. The dominant order in one the liquid organic soil amendment described herein is Lactobacillales. This order includes the families: Enterococcaceae, Lactobacillaceae and Leuconostocaceae. Bacteria in these three families are known for the production of lactic acid. Other bacteria orders known to function as probiotics in animals are: Bacillales, Enterobacteriales, Clostridiales, Actinomycetales and Burkhoderiales. Species from all of these orders may be present in the organic soil amendment and may be useful in ruminant animals. These species may function individually or in concert with each other.

Yet another embodiment is a method of decreasing nematodes in a ruminant animal by applying an organic soil amendment (such as the liquid organic soil amendment described herein) to the crops or the surrounding soil which are used as feed for the ruminant animal. The method may further include permitting the ruminant animal to graze on the crops produced with the organic soil amendment. The organic soil amendment may be prepared by any method described herein.

Organic Soil Amendment

In a preferred embodiment, the liquid soil amendment is prepared by diluting (such as with water) a liquid concentrated organic soil amendment, and (ii) the liquid concentrated organic soil amendment is prepared by:

(a) producing an initial extract from a compost having live beneficial microorganisms by soaking the compost in water;

(b) mixing the initial extract with additional water and recirculating the mixture;

(c) aerating the mixture following step (b);

(d) adding a supplemented medium or media to the mixture to feed the live beneficial microorganisms and promote their growth during the aerating step;

(e) introducing additives and beneficial microorganisms (such as archaea, bacteria, protozoa and/or nematodes) to the mixture, and (f) optionally refrigerating the mixture, wherein the mixture formed by this process is a liquid concentrated organic soil amendment.

In one embodiment, the beneficial microorganisms at least include beneficial bacteria.

In one embodiment, the methods described herein do not include applying any synthetic (or chemical) nematicides to the crops. In yet another embodiment, for crops which are currently treated with synthetic (or chemical) nematicides, the treatment is discontinued and the application of the organic soil amendment is begun.

The organic soil amendments introduce to crops live beneficial microorganisms and other additives. The live beneficial microorganisms are preferably selected based on the indigenous bacteria and fungi flora and fauna in a selected region where the crops are located. Regions with similar soil types and weather patterns may be assigned to zones. It is more preferable that the beneficial microorganisms and other additives are selected based on certain identified soil deficiency of a region. The organic soil amendments do not necessarily provide nitrogen, potassium, and phosphate compounds that can be directly absorbed by the crops. Rather, the organic soil amendments may facilitate the crops to more effectively utilize the nutrition that is already present in the surrounding soil. The live beneficial microorganisms in the organic soil amendments may break down the organic matter that is present in the soil, which is then converted to forms that is absorbable by the crops.

The organic soil amendments do not preclude the contemporary use of nitrogen, potassium, and phosphate compounds to treat the crops. In fact, the organic soil amendments may make the crops more effectively absorb the applied nitrogen, potassium, and phosphate compounds. As result, less chemical fertilizers and less times of application are required. In another embodiment, small amounts of nitrogen, potassium, and phosphate compounds can be added to the organic soil amendments, which can assist the effectiveness of the organic soil amendments.

The beneficial microorganisms are at least in part derived from indigenous soil bacteria and fungi of a selected region or zone. Compost from green or brown plant waste of a selected region or zone provides a good source of such microorganism. In a preferred embodiment, no manure is used in the organic soil amendments or in the process of producing the same. The composting process is typically according to U.S. Compost Council rules for composting. Additional beneficial microorganisms can be supplemented as isolates, which may be of a single strain or multiple strains.

The soil amendments may comprise chitin degrading microorganisms, which may include, without limitation, chitin degrading bacteria and/or fungi. The chitin degrading microorganisms may attack the cell walls of diseases causing fungi or the exoskeleton of insects, and strengthen the cell wall of the plants protecting them from insects and diseases, which can improve overall crop health.

Chitin degrading microorganisms may be introduced by incorporating shellfish shells in the aforementioned compost. Preferred shellfish shells include, but are not limited to, crab shells, shrimp shells, and oyster shells. The amount of shellfish shells is typically a fraction of the total compost materials. Preferably, the shellfish shells are about 0.1% to 5% by weight of the total compost materials, such as about 1.5%. Chitin degrading microorganisms may be also introduced by adding isolates of the microorganisms to the organic soil amendments.

The live beneficial microorganisms of the soil amendment are amplified to a high concentration by culturing the microorganisms in a supplemented medium. A supplemented medium refers to a culture medium that is enriched with nutrition for microorganism growth. A supplemented medium may include a carbon source, such as forms of simple and complex sugars (e.g., molasses), and protein source, which provides simple amino acids, or amino acids in the form of peptides and proteins, such as yeast extract or gluten.

In one embodiment, the live beneficial microorganisms in the organic soil amendment are kept in an aerobic state. When applied to the crops, the live beneficial microorganisms can immediately start to breakdown the organic matter in the soil and exert beneficial effects to the crops.

The organic soil amendments may be kept in concentrated form at a reduced temperature for storage and transportation without significantly compromising the viability of the live beneficial microorganisms. The organic soil amendments may be refrigerated, frozen, or lyophilized. The organic soil amendments may be refrigerated at between 32° F. to 44° F.

The organic soil amendments may be stored and transported in a frozen state. The live beneficial microorganisms can be reinvigorated quickly once the organic soil amendments are thawed and bring to ambient temperature, preferably with aeration and/or agitation.

The organic soil amendments can be lyophilized. The organic soil amendments are first frozen. Water within the organic soil amendments is removed under vacuum. This process further reduces the weight of the organic soil amendments for storage and transportation. The organic soil amendments can be reconstituted and reinvigorated prior to application. Similarly, the organic soil amendments can be dried and via a freeze-dry process.

Figure 2:
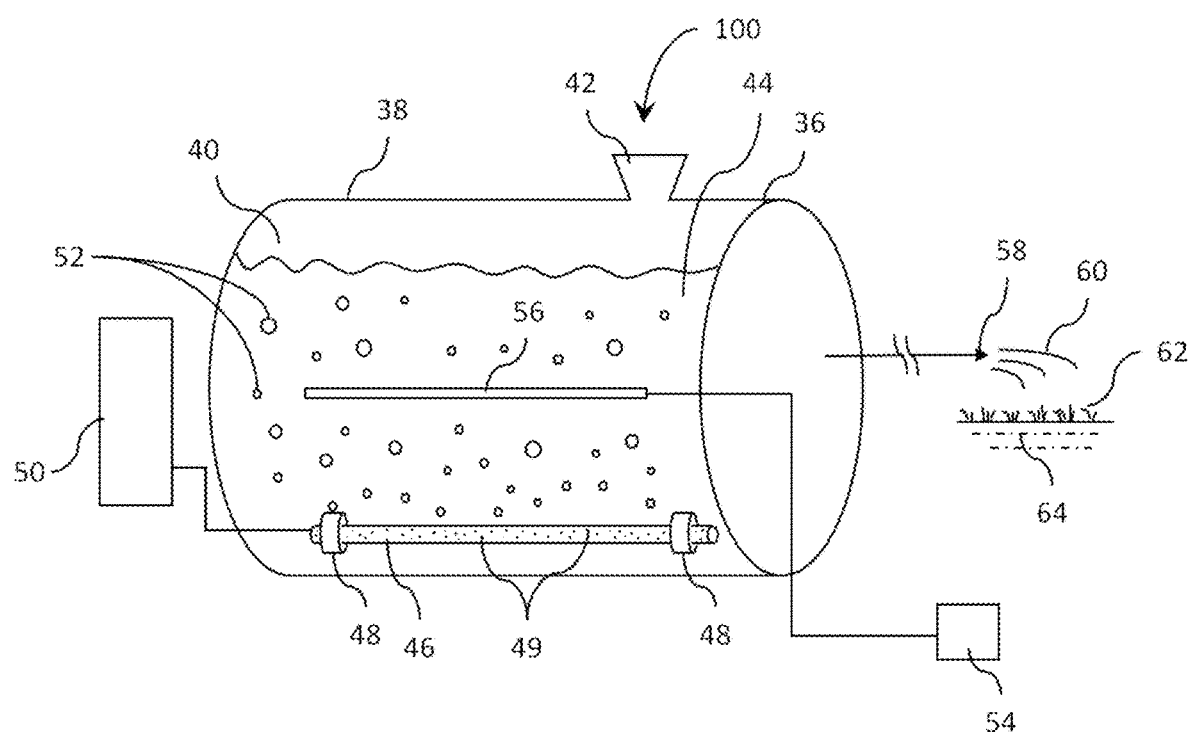
FIG. 2 is a schematic of a vessel according to one embodiment of the present invention.

The concentrated organic soil amendments can be diluted with water before applied to the crops. Diluted organic soil amendments can be stored for a prolonged period of time, e.g., as long as 30 days, without losing viability. To maintain the live beneficial microorganism in a substantially aerobic state, dissolved oxygen in the diluted organic soil amendments is preferably kept at an optimal level. It is preferable to supply enough oxygen to the diluted organic soil amendments though slow aeration. A conventional device or apparatus for slow aeration of a body of liquid can be readily adapted for this purpose by one skilled in the art. One embodiment of such a device is illustrated in FIG. 2.

The organic soil amendments may comprise plant extracts. For example without limitation, plant extracts that would stimulate the uptake of herbicides by unintended plants, e.g., weeds, which would drastically reduce the amount of herbicide needed to maintain the desired plants. Other plant extracts that promote healthy plant growth can be used with the organic soil amendments.

One preferred plant extract that can be incorporated in the organic soil amendment is tea tree oil, such as Melaceulca oil, or terpinen-4-ol type. It is preferably an essential oil steam distilled from the leaves and terminal branches of *Melaleuca alterniforni*. Another preferred plant extract is an extract of the yucca plant (*Yucca schidigera*), which comprises polysaccharides. For example, without limitation, 1% *Yucca schidigera* extract mixed with molasses may be added to the organic soil amendments.

The organic soil amendments may comprise components that provide humic acids and/or fulvic acids, which would promote healthy plant growth. For example, without limitation, compounds or preparations containing humic and/or fulvic acids may be added to the organic soil amendments.

The organic soil amendment may be prepared as follows. The process may begin with a compost derived from plant waste (green and brown)/vegetable waste, crab shells, oyster shells, and shrimp shells. The compost mix is made and aerated by turning to maintain aerobic decomposition reaching 160° F. for 3 consecutive days (standard U.S. Composting Council rules for composting). Temperatures are checked daily to determine turning times and frequency. Time of year can affect the time required for composting. To accommodate particular needs for plants of a certain region, a compost is made specifically for each region and refrigerated for the development of the organic soil amendment for each of the regions. For example, the United States and Canada may be divided into 11 regions. Each region has slightly different biomasses, therefore, a different compost is developed for each one. Green and brown wastes from these 11 separate regions are collected and used to make the compost for each region.

This process is illustrated in FIG. 1. Once the compost is finished it is stored for use (for example, under refrigeration). For example, 3-5 lbs finished compost is put into a permeable sack and placed in a 5 gallon pail (having water). The sack is left to stand for 72 hours with temperatures not to exceed 120° F. This step is termed Initial Extraction ("IE") 10. This solution is then placed in a 250 gallon Recirculation Extraction Tank (RET) 20 to run from 12-24 hours. Water is optionally added to the RET. Time of year affects the length of time required. The tank temperature is to not exceed 120° F. This solution is then transferred to an "Active Aerated Compost Tea" (AACT) 30 tank and aerated for 2-24 hours. Again, the timing depends on the volume of production as well as ambient temperature changes from season to season. During the AACT process, specific final ingredients 35, such as isolates of additional beneficial microorganism, plant extracts, and supplemented medium, are introduced at specific intervals to feed the compost organisms, and increase the development of the biotic population. Typically, the temperatures should not exceed 120° F. However, should the temperature rise above 120° F., the process can be slowed quickly to maintain 120° F. The organic soil amendment is cured once the temperature is between about 68 and 88° F. This process typically takes 24 hours to develop the "Nurse Batch". Once the batch is finished it is then dropped into a holding tank 33 with slow aeration and slow recirculation to maintain minimal activity of the beneficial microorganism.

Once the first "Nurse Batch" is made, sequential batches can be directly made, using the initial "Nurse Batch" to inoculate the preceding batch allowing for multiple product processing. For example, 22 gallons of the "Nurse Batch" can be introduced to the RET, which may be combined with another IE in the tank, and re-circulated for 2 hours, followed by transferring to the AACT for aeration for 2-24 hours, and sent to the holding tank 33 for processing.

The organic soil amendment is then moved to bottling and/or bulk delivery (the "Bottling Stage"). The product is placed in 4.5 gallon units and placed in refrigeration below 44° F. to slow the biotic activity in the container, and maintaining the life of the biotic solution for long term storage and delivery. Bulk delivery is taken directly to the end user and an aeration device is used to preserve the biotic activity of the organic soil amendment maintaining a temperature below 120° F. for end use for up to 30 days once diluted for end use.

The pasteurization process that inactivates the potentially harmful microorganisms is completed during the Compost Stage. The curing and biotic activity is maintained through the mixing process by maintaining temperatures below 120° F. during the entire process.

Live beneficial microorganisms found in the organic soil amendments are many. Typically, a great portion is "Normal Flora" and does not have specific identity. It is desirable to include Mycorrhizae fungi in the organic soil amendments. Typically, Mycorrhizae fungi may include, without limitation, any one of the following genus/species: *Glomus intrardices, G. mosseae, G. aggregatum, G. etunicatum, G. deserticola, G. monosporum, G. clarum, G. brasilianum, Gigaspora margarita, Rhizopogon villosullus, R. luteolus, R. amylopogon, R. fulvigleba, Pisolithus tinctorius, Suillus granulates, S. puctatipies, Laccaria laccata, Scleroderma cepa, S. citrinum*. The Mycorrhizae fungi may be from the compost or inoculated as isolates of difference species of Mycorrhizae fungi or mixtures thereof. For example, a mixture of Mycorrhizae fungi isolates may be added to the organic soil amendments during the amplification process.

Other fungi isolates that may be added to the organic soil amendments during the amplification process may include chitin degrading fungi, for example, without limitation, *Trichoderma harzianum*.

The growth that is appearing in the supper concentrate is mycelia growth from the oxygen remaining in the container allowing for *Penicillum* and *Actinobacteria* to grow. *Penicillium* growth can be unsightly and challenging to mechanical processes, however, the production of these organisms is extremely beneficial to plants and soils. Screening off of the mycelial growth will not detract from the efficacy of the organic soil amendment and may in fact increase the efficiency of natural disease suppression growing higher populations of *Actinobacteria* or *actinoycium*.

*Penicillium* fungi produces Penicillin antibiotics, which are historically significant because they are the first drugs that were effective against many previously serious diseases. All penicillins are beta-lactam antibiotics and are used in the treatment of bacterial infections caused by susceptible, usually Gram-positive, organisms.

*Actinobacteria* include some of the most common soil life, freshwater life, and marine life, playing an important role in decomposition of organic materials, such as cellulose and chitin, and thereby playing a part in organic matter turnover and carbon cycle. This replenishes the supply of nutrients in the soil and is a part of humus formation. Other *Actinobacteria* inhabit plants and animals.

*Actinobacteria* are known as secondary metabolite producers. In 1940 Selman Waksman discovered that the soil bacteria he was studying made actinomycin, a discovery for which he received a Nobel Prize. Since then, hundreds of naturally occurring antibiotics have been discovered in these terrestrial microorganisms, especially from the genus *Streptomyces*.

Some *Actinobacteria* form branching filaments, which somewhat resemble the mycelia of the unrelated fungi, among which they were originally classified under the older name Actinomycetes. Most members are aerobic, but a few, such as *Actinomyces israelii*, can grow under anaerobic conditions. Unlike the *Firmicutes*, the other main group of Gram-positive bacteria, they have DNA with a high GC-content, and some Actinomycetes species produce external spores.

Some types of *Actinobacteria* are responsible for the peculiar odor emanating from the soil after rain (Petrichor), mainly in warmer climates. The chemical that produces this odor is known as Geosmin.

The organic soil amendments may also comprise nitrogen fixing bacteria, such as *Rhizobiales, Frankia, Azospirillum, Azotobacter, Bacillus subtilis, Bacillus licheniformis, Lactobacillus acidophilus, Bacillus popilliae*, and *Chitinibacter tainanensis*.

The microorganism based soil amendments described herein can include bacteria in the orders: Bacillales, Burkhoderiales, Enterobacteriales, Clostridiales and Lactobacillales. The dominant order is Lactobacillales and the dominant genus is *Lactobacillus*. This was determined by the percentage of hits in 16S rRNA sequencing. On average, there were 79 Lactobacillus species observed per sample over 13 samples tested in one experiment. Over the 13 samples in this experiment, there were 94 Lactobacillus species observed. In addition, 71 other Lactobacillales species were found in these 13 samples. Therefore, the microorganism based soil amendment described herein used as probiotics contains as many as 165 Lactobacillales species as determined by 16S rRNA sequencing. A list of the 165 species of Lactobacillales is shown below.

| # | Name |
|---|---|
| 1 | *Abiotrophia defectiva* |
| 2 | *Aerococcus urinaeequi* |
| 3 | *Aerococcus viridans* |
| 4 | *Alkalibacterium iburiense* |
| 5 | *Alkalibacterium psychrotolerans* |
| 6 | *Alkalibacterium subtropicum* |
| 7 | *Carnobacterium funditum* |
| 8 | *Carnobacterium inhibens* |
| 9 | *Carnobacterium maltaromaticum* |
| 10 | *Carnobacterium mobile* |
| 11 | *Enterococcus avium* |
| 12 | *Enterococcus casseliflavus* |
| 13 | *Enterococcus cecorum* |
| 14 | *Enterococcus columbae* |
| 15 | *Enterococcus durans* |
| 16 | *Enterococcus gallinarum* |
| 17 | *Enterococcus gilvus* |
| 18 | *Enterococcus italicus* |
| 19 | *Enterococcus lactis* |
| 20 | *Enterococcus silesiacus* |
| 21 | *Facklamia hominis* |
| 22 | *Facklamia languida* |
| 23 | *Facklamia tabacinasalis* |
| 24 | *Fructobacillus ficulneus* |
| 25 | *Fructobacillus fructosus* |
| 26 | *Fructobacillus pseudoficulneus* |
| 27 | *Fructobacillus tropaeoli* |
| 28 | *Granulicatella adiacens* |
| 29 | *Lactobacillus acidophilus* |
| 30 | *Lactobacillus oris* |
| 31 | *Lactobacillus acidifarinae* |
| 32 | *Lactobacillus tucceti* |
| 33 | *Lactobacillus acidipiscis* |
| 34 | *Lactobacillus gallinarum* |
| 35 | *Lactobacillus crispatus* |
| 36 | *Lactobacillus secaliphilus* |
| 37 | *Lactobacillus otakiensis* |
| 38 | *Lactobacillus casei* |
| 39 | *Lactobacillus letivazi* |
| 40 | *Lactobacillus rhamnosus* |
| 41 | *Lactobacillus japonicus* |
| 42 | *Lactobacillus fructivorans* |
| 43 | *Lactobacillus farciminis* |
| 44 | *Lactobacillus diolivorans* |
| 45 | *Lactobacillus amylovorus* |
| 46 | *Lactobacillus hammesii* |
| 47 | *Lactobacillus kalixensis* |
| 48 | *Lactobacillus buchneri* |

| # | Name |
|---|---|
| 49 | *Lactobacillus ingluviei* |
| 50 | *Lactobacillus kefiranofaciens* |
| 51 | *Lactobacillus apis* |
| 52 | *Lactobacillus kefiri* |
| 53 | *Lactobacillus hamsteri* |
| 54 | *Lactobacillus fermentum* |
| 55 | *Lactobacillus crustorum* |
| 56 | *Lactobacillus vaginalis* |
| 57 | *Lactobacillus kisonensis* |
| 58 | *Lactobacillus thailandensis* |
| 59 | *Lactobacillus parabuchneri* |
| 60 | *Lactobacillus zeae* |
| 61 | *Lactobacillus collinoides* |
| 62 | *Lactobacillus pantheris* |
| 63 | *Lactobacillus bobalius* |
| 64 | *Lactobacillus paralimentarius* |
| 65 | *Lactobacillus homohiochii* |
| 66 | *Lactobacillus pobuzihii* |
| 67 | *Lactobacillus nantensis* |
| 68 | *Lactobacillus frumenti* |
| 69 | *Lactobacillus similis* |
| 70 | *Lactobacillus pentosus* |
| 71 | *Lactobacillus reuteri* |
| 72 | *Lactobacillus agilis* |
| 73 | *Lactobacillus guizhouensis* |
| 74 | *Lactobacillus senmaizukei* |
| 75 | *Lactobacillus gastricus* |
| 76 | *Lactobacillus hilgardii* |
| 77 | *Lactobacillus nodensis* |
| 78 | *Lactobacillus parabrevis* |
| 79 | *Lactobacillus intermedius* |
| 80 | *Lactobacillus manihotivorans* |
| 81 | *Lactobacillus ultunensis* |
| 82 | *Lactobacillus suebicus* |
| 83 | *Lactobacillus johnsonii* |
| 84 | *Lactobacillus hayakitensis* |
| 85 | *Lactobacillus lindneri* |
| 86 | *Lactobacillus brevis* |
| 87 | *Lactobacillus amylolyticus* |
| 88 | *Lactobacillus equicursoris* |
| 89 | *Lactobacillus malefermentans* |
| 90 | *Lactobacillus plantarum* |
| 91 | *Lactobacillus gigeriorum* |
| 92 | *Lactobacillus mucosae* |
| 93 | *Lactobacillus delbrueckii* |
| 94 | *Lactobacillus helveticus* |
| 95 | *Lactobacillus brantae* |
| 96 | *Lactobacillus antri* |
| 97 | *Lactobacillus parakefiri* |
| 98 | *Lactobacillus oligofermentans* |
| 99 | *Lactobacillus salivarius* |
| 100 | *Lactobacillus pontis* |
| 101 | *Lactobacillus taiwanensis* |
| 102 | *Lactobacillus fabifermentans* |
| 103 | *Lactobacillus panis* |
| 104 | *Lactobacillus intestinalis* |
| 105 | *Lactobacillus vaccinostercus* |
| 106 | *Lactobacillus faeni* |
| 107 | *Lactobacillus equi* |
| 108 | *Lactobacillus coleohominis* |
| 109 | *Lactobacillus ruminis* |
| 110 | *Lactobacillus siliginis* |
| 111 | *Lactobacillus jensenii* |
| 112 | *Lactobacillus acetotolerans* |
| 113 | *Lactobacillus parafarraginis* |
| 114 | *Lactobacillus namurensis* |
| 115 | *Lactobacillus farraginis* |
| 116 | *Lactobacillus camelliae* |
| 117 | *Lactobacillus versmoldensis* |
| 118 | *Lactobacillus paracasei* |
| 119 | *Lactobacillus gasseri* |
| 120 | *Lactobacillus paraplantarum* |
| 121 | *Lactobacillus alimentarius* |
| 122 | *Lactobacillus kitasatonis* |
| 123 | *Leuconostoc argentinum* |
| 124 | *Leuconostoc carnosum* |
| 125 | *Leuconostoc garlicum* |
| 126 | *Leuconostoc gasicomitatum* |
| 127 | *Leuconostoc gelidum* |
| 128 | *Leuconostoc inhae* |
| 129 | *Leuconostoc kimchii* |
| 130 | *Leuconostoc mesenteroides* |
| 131 | *Leuconostoc palmae* |
| 132 | *Leuconostoc pseudomesenteroides* |
| 133 | *Marinilactibacillus piezotolerans* |
| 134 | *Oenococcus kitaharae* |
| 135 | *Streptococcus alactolyticus* |
| 136 | *Streptococcus australis* |
| 137 | *Streptococcus bovis* |
| 138 | *Streptococcus castoreus* |
| 139 | *Streptococcus dentirousetti* |
| 140 | *Streptococcus equinus* |
| 141 | *Streptococcus fryi* |
| 142 | *Streptococcus gallinaceus* |
| 143 | *Streptococcus infantarius* |
| 144 | *Streptococcus luteciae* |
| 145 | *Streptococcus macedonicus* |
| 146 | *Streptococcus thermophilus* |
| 147 | *Streptococcus ursoris* |
| 148 | *Streptococcus vestibularis* |
| 149 | *Tetragenococcus doogicus* |
| 150 | *Tetragenococcus halophilus* |
| 151 | *Tetragenococcus koreensis* |
| 152 | *Tetragenococcus solitarius* |
| 153 | *Vagococcus fluvialis* |
| 154 | *Vagococcus penaei* |
| 155 | *Vagococcus teuberi* |
| 156 | *Weissella cibaria* |
| 157 | *Weissella hanii* |
| 158 | *Weissella hellenica* |
| 159 | *Weissella koreensis* |
| 160 | *Weissella minor* |
| 161 | *Weissella paramesenteroides* |
| 162 | *Weissella salipiscis* |
| 163 | *Weissella soli* |
| 164 | *Weissella thailandensis* |
| 165 | *Weissella viridescens* |

In accordance with one embodiment, a vessel is provided for maintaining the organic soil amendments in a ready to use form. The vessel has an inside and an outside with an organic soil amendment introduction port connecting the inside with the outside where microbes are introduced to the vessel. An aerator is provided on the inside of the vessel, a gas supply is connected with the aerator, a temperature control device is connected with the vessel and a special spray device is connected with the vessel.

In another aspect, the gas supply is oxygen-nitrogen. In still another aspect, the aerator is secured to the inside of the vessel at the bottom of the vessel. In one aspect, the aerator is a tube that includes a sintered weight connected with the tube and in another aspect, the sintered weight is selected from a group consisting of: stone, steel and steel and plastic wool.

An exemplary embodiment is illustrated by way of example in FIG. 2. An organic soil amendment storage system 100 is illustrated with reference to a vessel 36. Vessel 36 includes an inside 38 and an outside 40 and an organic soil amendment introduction port 42, wherein organic soil amendment is introduced to the vessel 36. Vessel 36 includes water 44 or some other medium for reanimation of the live beneficial microorganisms.

Additionally, vessel 36 includes an aerator 46 on the inside 38. Aerator 46 is secured within vessel 36 and may include sintered weights 48 that may be made of stone, steel or steel or plastic wool for example only for the purpose of weighting aerator 46.

A gas supply 50 is connected with aerator 46 as illustrated for the purpose of delivering re-animation enhancing gas 52, such as $O_2$—$N_2$ or ambient air, to the aerator. Aerator 46 includes fenestrations 49 which evenly distribute gas 52.

Further, temperature control device 54 is connected with vessel 36 in any efficient manner, such as by means of a heating element 56 on the inside 36 as illustrated, for example only. Proper temperature control ensures efficient re-animation and temperature control device 54 enables a user to adjust the temperature as needed to compensate for local conditions. Heating element 56 may be located in any desired place and may, for example only and not by way of limitation, be placed in series with gas supply 50 so as to heat the gas 52 evenly prior to introduction into the vessel 36.

Still referring to FIG. 2, a sprayer 58 may be connected with vessel 36 for the purpose of applying organic soil amendment 60 to crops 62 and/or to soil 64.

By way of further description and disclosure, Applicants have developed a unique combination of indigenous microorganisms and nutrients to enhance plant health, quality and quantity without artificial chemical fertilizer. What is included, as has been discussed above, is a combination of indigenous microorganisms that are first identified by the procurement of a sample of decomposed plant material (compost) and the microorganisms that digest these plants. The microorganisms then are grown in a tissue culture medium and their specific nutritional requirements are met (deficiencies remedied) at an optimal temperature for growth. Then they are hydrated at a proper temperature for growth and aerated so that a few microorganisms grow into millions in a matter of hours. Once a desired concentration of these organisms is achieved, they are then cooled and concentrated, optionally frozen and preserved to facilitate storage and transportation. Once taken to the site for use, they are reanimated and they are brought up to a specific concentration for the desired/required effect for the economical enhancement of the area to be treated.

According to one aspect, the system and method functions to enhance crop health by way of the effect of a unique combination of microorganisms and plant extracts to causing suppression of plant diseases, insects, and fungi without the requirement of artificial pesticides or reducing this requirement. The organic soil amendment described herein provides a unique combination of microorganisms and plant extracts that suppress plant diseases, insects and fungi by enhancing the growth of the plants to that their natural growth and resistance can be enhanced without the presence of these toxic pesticides. This is done by growing beneficial bacteria that are beneficial to the plants, or at least not harmful, but which have a negative effect on the target plants, insects and fungi. Specifically, the beneficial bacteria are not harmful to the desired plants but suppress the target plants (e.g. weeds), insects and fungi. Some desired bacteria are *Paenibacillus popilliae, Bacillus subtilis, B. megaterium, B. pumilus, B. lichenformis, B. azooformans, B. polymyxa, Lactobacillus* spp., *Streptomyces* spp. Additionally, *Trichiderma* spp. and chitin degrading *Bacillus* spp., for example only and not by way of limitation, penetrate insects and fungus causing damage to insects and fungi or cause insects to change their feeding and reproductive habits. Beneficial bacteria in the soil amendment make nutrients and other food sources available to the plant and increase the cell wall thickness of the plant giving it a natural defense against fungal diseases. That is, the desired beneficial bacteria degrades the bad bacteria by decreasing its cell wall thickness, enhances plants by increasing its cell wall thickness and by attacking insects or driving then away. While nitrogen fixing bacterial produce and store nitrogen, protozoa must find and feed on the bacteria in order for it to convert into a form of nitrogen that can be used by plants.

According to another aspect, enhancing crop health is accomplished by means of a unique combination of polysaccharides, plant extracts and microorganisms that suppress regrowth and propagation of weeds by increasing the effectiveness of artificial manufactured herbicide by a factor of ten.

The combinations of amino, humic and fulvic acids stimulate growth hormones in plants allowing them to ingest a far greater amount of herbicide than a plant that is not stimulated by these acids. The acids are produced from the plant extracts and essential oils that are added to the process that enable the growth of beneficial organisms to perpetuate and increase releasing more of the food sources to stimulate plants. Similar to growth regulation, the plant growth is enhanced allowing for the herbicides to work efficiently with less applied artificial stimulation.

Previously, pesticides and herbicides have been applied to crops to kill weeds or discourage them so they leave the area or die. The usual herbicides function by suppressing weed growth and herbicides work by entering the unwanted weeds and enter into the plant. It interrupts the core plant's ability to conduct photosynthesis deep in the plant cells. If the plant continues to grow but cannot feed itself, it actually grows itself to death. In order for herbicides to work, it has to enter the plant. In order to enter the plant, it needs to first decrease the surface tension to stick to the weed and then ultimately to penetrate the weed.

Combinations of molasses, corn syrup, gluten, brewer's yeast as well as amino acids, such as arginine, asparagine, α-ketosuccinamic acid, glutamic acid, tyrosine, aspartic acid, alanine, praline, glutamine, ornithine, citrulline and cysteine, and fatty acids (such as dodecanoic, tetradecanoic, and elcosanic acid) reduce the surface tension of plants allowing for the herbicide to penetrate the plant efficiently. The growth stimulation that occurs from the sugar production increases the opening of stomata (pores) of the plant creating instant absorption and translocation of the herbicide causing quick decline of weeds. Additionally, certain bacteria in the soil amendment produce bio-surfactants that also contribute to herbicide penetration affect. Examples of these bacteria can be found in the *Bacillus* and *Lactobacillus* genera such as *B. subtilis* and *L. brevis.*

In the past, when attempting to enhance microbial growth in a tissue culture, it was necessary to supply nutrients to the culture medium, water, temperature, and aeration for optimum bacterial growth. Transportation was then done in large pots of 275 gallons which is cumbersome and has a limited job life because these organisms must be aerated, maintained at certain temperatures or they perish. In these confined spaces, there are living growths which produce waste materials that would pollute the entire colony and kill them all in 3 to 4 days by creating an anaerobic environment causing death.

Alternatively, the system and method can be used for enhancing crop health by means of concentrating these desired microorganisms, causing their subsequent hibernation and then reanimation. This allows them to be stored for a long period of time in hibernation, delivered to the desired site for application and at the time they are needed they are reanimated as living organisms. This results in the need to transport very compact material instead of 275 gallons or more of liquid. The same amount of living organisms can be found and stored in four 5 gallon containers which is a factor of 10 to 1. This substantially decreases transportation costs, effort and equipment. Further, once a culture of beneficial microorganisms has been developed it is then possible to place them and sustain them in animation, hibernation so as to keep a living inventory for a prolonged period of time. Some studies suggest that living cells can be stored for as long as 100 years if they are properly frozen. One means for concentrating the organisms is evaporation. One means for suspending animation is freezing.

By way of further description, the prior art manufacture of nitrate, phosphates, and potassium require large amounts of natural gas or petroleum in the production of these raw materials. The transportation of these chemicals requires the consumption of additional fuel to deliver tons of products hundreds of miles from manufacturing plants. The process described herein allows specific native microbes to be multiplied "on site" much nearer to the site of final use. A few pounds of concentrated living microbes can be multiplied on site overnight to provide trillions of organisms for use when kept at an optimum temperature and gives virtually unlimited nutrients. For example, two microbes can reproduce to twenty in a few seconds then twenty times two hundred and on and on all within a few minutes. Specifically, one acre can be treated with about twenty pounds of concentrated microbes, whereas the prior nitrate, phosphate and potassium mix would take approximately seventy pounds of material per acre.

Still further, by way of another advantage, because of the "living" nature of the beneficial microorganisms, the number of applications required per year can be substantially less because they are stronger and last longer.

The organic soil amendment may be prepared by the methods described in U.S. Pat. No. 8,790,436, which is hereby incorporated by reference in its entirety.

EXAMPLES

For the greenhouse and field trials, nematode eggs were placed in the soil and the soil watered with a dilution of the organic soil amendment. Typically only one application of the organic soil amendment would be made but some trials used several applications. At the end of the trial, the nematodes would be extracted from the soil around the root zone and counted.

For the bench top studies, a sand column nematode cleaning apparatus was used. Essentially, a known number of nematodes would be loaded to the top of a sand column, and the sand column would be suspended with a nylon mesh over water in a beaker. The nematodes are attracted to the water, so they move through the column and fall into the water. After 24 hours the nematodes are counted in the water. The sand can be treated with various substances to measure the impact on nematode motility and viability. When the sand is treated with a standard commercial dilution of Holganix, the number of nematodes that make it through drops dramatically. Controls=206, 212 and 227 nematodes, versus Holganix in the sand=38, 42 and 51 nematodes made it through.

Example 1

The organic soil amendment described herein was administered on a golf course in Florida. Nematode counts were taken before treatment and 1 year after treatment. Approximately 7 ounces of the organic soil amendment per 1,000 sq. ft. (~2.25 gallons per acre) was applied every 4-6 weeks.

The results are provided in the tables below.

| Club Course Front Nine Nematode Counts (Bermuda Grass) | | | |
| --- | --- | --- | --- |
| | Sting Nematodes | Root Knot Nematodes | Lance Nematodes |
| Before | 13 | 140 | 10 |
| After 1 Year | 0 | 48 | 0 |

| Club Course Back Nine Nematode Counts | | | |
| --- | --- | --- | --- |
| | Sting Nematodes | Root Knot Nematodes | Lance Nematodes |
| Before | 21 | 140 | 8 |
| After 1 Year | 0 | 32 | 0 |

| Old Course Front Nine Nematode Counts | | | |
| --- | --- | --- | --- |
| | Sting Nematodes | Root Knot Nematodes | Lance Nematodes |
| Before | 17 | 160 | 110 |
| After 1 Year | 0 | 20 | 4 |

| Club Course Back Nine Nematode Counts | | | |
| --- | --- | --- | --- |
| | Sting Nematodes | Root Knot Nematodes | Lance Nematodes |
| Before | 18 | 140 | 92 |
| After 1 Year | 0 | 24 | 28 |

Example 2

The liquid organic soil amendment was tested against soybean cyst, corn lesion and tomato root knot nematodes as follows.

In a field test, the liquid organic soil amendment was applied to the soil at 0.5 gallons per acre at planting to a soybean field infested with nematodes and each plant was inoculated with an additional 2,000 eggs of soybean cyst nematodes. Yield and nematode count was determined at the end of the season. A 75-80% reduction in cyst nematodes was observed. The result was well below the economic threshold whereby nematodes cause yield loss. Consequently, an increase in the soybean yield of approximately 6.5% was obtained when compared against a control.

For the bench top studies, a sand column nematode cleaning apparatus was used. A known number of nematodes were loaded to the top of a sand column, and the sand column would be suspended with a nylon mesh over water in a beaker. The nematodes are attracted to the water, so they move through the column and fall into the water. After 24 hours the nematodes are counted in the water. The sand can be treated with various substances to measure the impact on nematode motility and viability. When the sand was treated with a dilution of the organic soil amendment, the number of nematodes that made it through dropped dramatically. The control groups had 206, 212 and 227 soybean cyst nematodes make it through, while the organic soil amendment treated groups had only 38, 42, and 51 nematodes make it through. In the experiments with corn lesion and tomato root knot nematodes, the organic soil amendment resulted in a significant reduction of nematodes (~100% for tomato and around 80% for corn).

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention.

All references cited herein are incorporated by reference.

The invention claimed is:

1. A method for controlling plant pathogenic nematodes on a crop comprising applying a liquid organic soil amendment to the crop and/or surrounding soil, wherein (i) the liquid soil amendment is prepared by diluting a liquid concentrated organic soil amendment, and (ii) the liquid concentrated organic soil amendment is prepared by:
   (a) producing an initial extract from a compost having live beneficial microorganisms by soaking the compost in water;
   (b) mixing the initial extract with additional water and recirculating the mixture;
   (c) aerating the mixture following step (b);
   (d) adding a supplemented medium or media to the mixture to feed the live beneficial microorganisms and promote their growth during the aerating step;
   (e) introducing additives and beneficial microorganisms to the mixture, and
   (f) refrigerating the mixture, wherein
   the mixture formed by the method is a liquid concentrated organic soil amendment, and
   the liquid soil amendment contains Pichia fermentans, Pichia membranifaciens, or both.

2. The method of claim 1, wherein the liquid soil amendment is applied to agricultural crops.

3. The method of claim 2, wherein the agricultural crops are selected from maize, barley, sorghum, oats, rye, rice, potatoes, forage, cassava, sweet potatoes, wheat, soybeans, rapeseed, sunflower seed, alfalfa, citrus, cotton, peanuts, sugar beet, tobacco, soy, tomatoes, and any combination of any of the foregoing.

4. The method of claim 1, wherein the initial extract is produced by soaking a compost comprising green and brown plant waste, and is free of manure.

5. The method of claim 1, wherein the initial extract is produced by soaking a compost comprising shell fish shells.

6. The method of claim 5, wherein the shell fish shells comprise 0.5- 1.5% by weight of the compost.

7. The method of claim 5, wherein the shell fish shells comprise oyster shells, crab shells, shrimp shells, or a combination thereof.

8. The method of claim 1, wherein the mixture is recirculated for 1-2 days.

9. The method of claim 1, wherein the mixture is aerated for 2 to 24 hours.

10. The method of claim 1, wherein the beneficial microorganisms of step (a), step (e), or both comprise mycorrhizae fungi, Trichoderma fungi, or a combination thereof.

11. The method of claim 1, wherein the supplemented medium comprises molasses, yeast extract, yucca extract or a combination thereof.

12. The method of claim 1, wherein the additives comprise humic acids, fulvic acids, or a combination thereof.

13. The method of claim 1, wherein the beneficial microorganisms of step (a), step (e), or both comprise chitin degrading fungi.

14. The method of claim 1, wherein the mixture is refrigerated at a temperature between 32° F. and 44° F.

15. The method of claim 1, wherein the initial extract is produced at a temperature not exceeding 120° F.

16. The method of claim 8, wherein the mixture is recirculated at a temperature not exceeding 120° F.

17. The method of claim 9, wherein the mixture is aerated at a temperature not exceeding 120° F.

18. A method of controlling plant pathogenic nematodes in turf comprising applying a liquid organic soil amendment to the turf and/or the surrounding soil, wherein (i) the liquid soil amendment is prepared by diluting a liquid concentrated organic soil amendment, and (ii) the liquid concentrated organic soil amendment is prepared by:
   (a) producing an initial extract from a compost having live beneficial microorganisms by soaking the compost in water;
   (b) mixing the initial extract with additional water and recirculating the mixture;
   (c) aerating the mixture following step (b);
   (d) adding a supplemented medium or media to the mixture to feed the live beneficial microorganisms and promote their growth during the aerating step;
   (e) introducing additives and beneficial microorganisms to the mixture, and
   (f) refrigerating the mixture, wherein
   the mixture formed by the method is a liquid concentrated organic soil amendment, and
   the liquid soil amendment contains *Pichia fermentans, Pichia membranifaciens*, or both.

19. The method of claim 18, wherein the turf is selected from St. Augustine Grass (*Stenotaphrum secundatum*), Bermudagrass (*Cynodon dactylon*), Bahiagrass (*Paspalum notatum*), Centipede Grass (*Eremochloa ophiuroides*), Buffalo Grass (*Bouteloua dactyloides*), Zoysia Grass (*Zoysia matrella*), Bentgrass (*Agrostis stolonifera*), Kentucky Bluegrass (*Poa pratensis*), Rough Bluegrass (*P. trivahs*), Red Fescue (*Festuca arundinacea*), Annual Ryegrass (*Lohum multiflorum*), Perennial Ryegrass (*L. perenne*), Tall Fescue (*Festuca arundinacea*), and Carpetgrass (*Axonopus fisifolius*).

20. A method for controlling plant pathogenic nematodes on a crop comprising applying an effective amount of *Pichia fermentans, Pichia membranifaciens*, or both to the crop and/or surrounding soil.

21. A method for suppressing nematode egg hatching comprising applying a liquid organic soil amendment to the nematode eggs or a crop and/or soil surrounding the nematode eggs, wherein (i) the liquid soil amendment is prepared by diluting a liquid concentrated organic soil amendment, and (ii) the liquid concentrated organic soil amendment is prepared by:
   (a) producing an initial extract from a compost having live beneficial microorganisms by soaking the compost in water;
   (b) mixing the initial extract with additional water and recirculating the mixture;
   (c) aerating the mixture following step (b);
   (d) adding a supplemented medium or media to the mixture to feed the live beneficial microorganisms and promote their growth during the aerating step;

(e) introducing additives and beneficial microorganisms to the mixture, and
(f) refrigerating the mixture, wherein
the mixture formed by the method is a liquid concentrated organic soil amendment, and
the liquid soil amendment contains Pichia fermentans, Pichia membranifaciens, or both.

\* \* \* \* \*